Feb. 17, 1959   B. CAMETTI ET AL   2,874,007
BEARINGS
Filed July 1, 1954
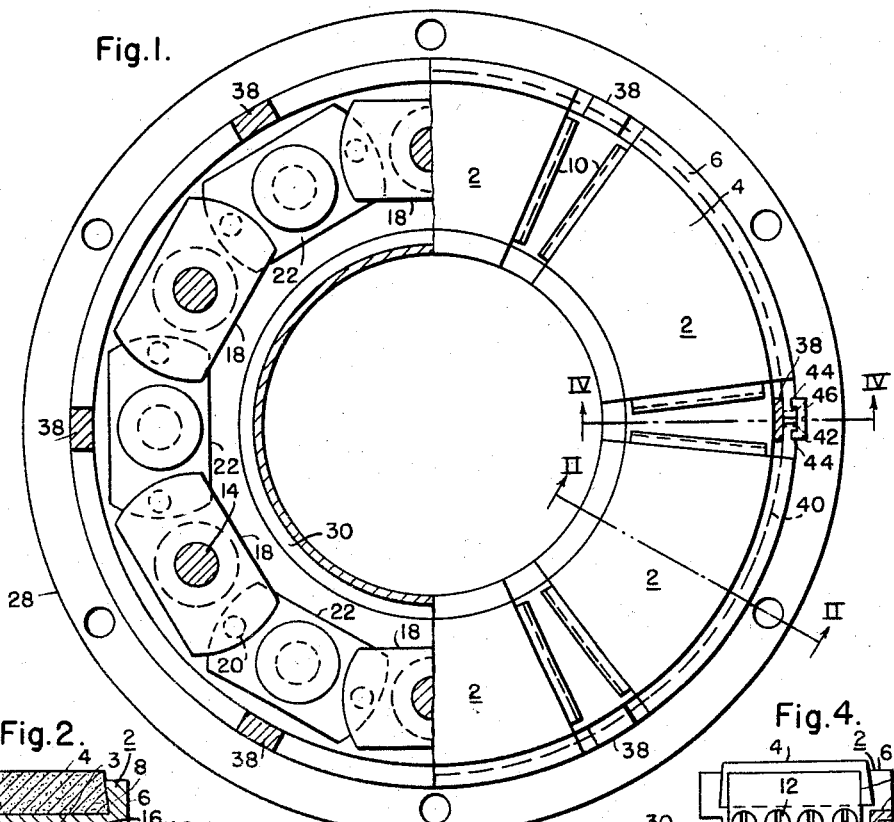
Fig.1.
Fig.2.
Fig.3.
Fig.4.
Fig.5.
Fig.7.
Fig.6.
WITNESSES:
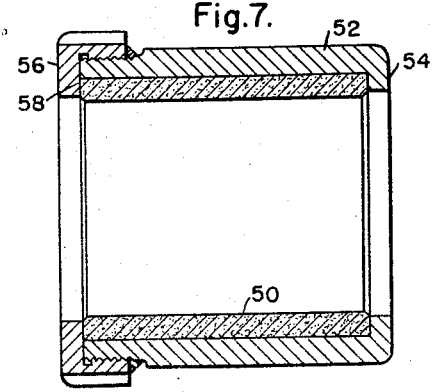
INVENTORS
Benjamin Cametti and
William M. Wepfer.
BY
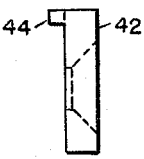
ATTORNEY

United States Patent Office 2,874,007
Patented Feb. 17, 1959

2,874,007

BEARINGS

Benjamin Cametti and William M. Wepfer, Pittsburgh, Pa., assignors to Westinghouse Electric Corporation, East Pittsburgh, Pa., a corporation of Pennsylvania Application July 1, 1954, Serial No. 440,827

11 Claims. (Cl. 308—160)

Our invention relates to bearings, and particularly bearings adapted to operate in a system utilizing a low viscosity fluid as the lubricant.

Where a low viscosity fluid is used as the lubricant, it has been the practice in the prior art to fabricate bearings from a hard, brittle material, such as carbon compounds, ceramic compounds, plastics, stellites or carbides whereby the bearing material is selected so that it is easily wetted by the fluid. These materials perform effectively as bearings using low viscosity fluids as lubricants, but tend to fail under shock loads due to their low tensile strength and brittleness. A shock load imposes a bending stress on the bearing material which subjects one surface to compression and the opposite surface to tension. We have discovered that these materials would withstand shock loads if they are always maintained under a compression load because of their high strength in compression. We have, therefore, provided means whereby these hard, brittle materials can be preloaded under a high compression stress prior to their use as bearings, thus enabling them to withstand shock loads. The preloaded compressive stress should be high enough so that even when part of the compressive stress is removed by the tension stress due to a sudden shock load caused by rapid thermal or mechanical changes, the bearing material is still under a compressive load.

We have also provided a construction whereby our preloading of bearing materials can be applied to the individual thrust shoes of a pivoted shoe type of thrust bearing. One problem with pivoted shoe type of thrust bearings is that of retaining all of the members in place while the bearing is being assembled, particularly in the case of a fully equalized pivoted shoe thrust bearing of the self-leveling type. We have solved this problem by providing a pivoted shoe thrust bearing of unit construction where all of the various elements of the bearing are retained in their proper place yet allowed freedom of movement so that they can seek their own individual operating position. In addition, all of the elements can easily be removed in the conventional manner for servicing or replacement.

Accordingly, the principal object of our invention is to provide bearings where the bearing material is preloaded under a compressive stress.

Another object of our invention is to provide a journal bearing where the bearing material is preloaded under a compressive stress.

Another object of our invention is to provide a thrust bearing of the pivoted pad type where the bearing material of each pad is preloaded under a compressive stress.

Another object of our invention is to provide a thrust bearing of the pivoted pad type of unitary construction so that it may be handled as a unit without the individual elements comprising the thrust bearing falling from the main frame member of the thrust bearing.

Other objects of the invention will be apparent from the following description, taken in conjunction with the accompanying drawings, in which:

Figure 1 is a top view of a self-equalizing pivoted pad thrust bearing constructed according to our invention shown half in section along line I—I in Fig. 3 and half in plan form;

Fig. 2 is a radial section of a thrust shoe taken along line II—II of Fig. 1, showing the mounting of the bearing material in the thrust shoe;

Fig. 3 is a partial circumferential section taken along the circumferential centerline of the thrust shoes and showing the pivoted supporting links for the thrust shoes;

Fig. 4 is a radial section taken along line IV—IV of Fig. 1 showing the channel-shaped bearing support and method used to retain the thrust shoes and pivoted supporting links in the bearing support;

Fig. 5 is an enlarged front view of the member used for securing the retaining ring to the bearing support;

Fig. 6 is an enlarged side view of the member shown in Fig. 5; and

Fig. 7 is a longitudinal section of a radial bearing constructed according to our invention.

In Fig. 1, therein shown, partly in plan view and partly in sectional view, a fully equalized self-leveling thrust bearing of the pivoted pad type, in which each individual pivoted thrust pad is allowed to seek within certain limits its own running position, so as to establish a wedge-shaped film of lubricating fluid between itself and the mating thrust collar (not shown in Fig. 1) by means of which wedge of lubricating fluid it supports a thrust load. In such a design, each individual pivoted thrust pad 2 is mounted so that it is free to tilt in any direction and, in addition, is allowed to move in a direction perpendicular to the plane of the thrust bearing. Thus each pivoted thrust pad can tilt until it establishes a wedge-shaped film of lubricating fluid and, in addition, level itself in relation to the remaining pivoted thrust pads comprising the thrust bearing so that each thrust pad carries a proportional share of the thrust load.

Each pivoted thrust pad 2 is composed of a bearing portion 4 in the form of a segment of a circle of bearing material (Figs. 2, 3 and 4), preferably of a hard material such as carbon graphite, aluminum oxide, stellite or tungsten carbide, mounted in a channel-shaped retaining member 6. The channel-retaining member 6 has a dovetailed shape formed by inclining the inner surfaces of sides 8 (Fig. 2), and the sides of each bearing portion 4 are correspondingly shaped so that the bearing portion 4 is positively retained in the member 6. Small spring action retaining plates 10 are attached at one end to member 6, by means of screws 12 at each end of the channel, and the opposite ends thereof engage opposite ends of bearing portions 4 to retain bearing portions 4 in a circumferential direction.

In manufacturing each bearing portion 4, its lateral dimension is made slightly larger than the corresponding dimension of the dovetailed channel in retaining member 6. In order to assemble bearing portion 4 in the retaining member 6, retaining member 6 is heated sufficiently to cause it to expand and allow insertion of bearing material 4 and then the assembled unit is allowed to cool, thus compressing the material of bearing portion 4 in a radial direction.

The circumferential dimension of bearing portion 4 is made larger than the corresponding circumferential dimension of retaining member 6, thus when spring action retaining plates 10 are attached to retaining member 6 they will compress bearing portion 4 in a circumferential direction. Retaining plates 10 have a reduced portion 11 which imparts to retaining plates 10 their spring action. This reduced portion can be increased in cross-section if more circumferential compression of bearing portion 4 is desired or decreased if less compression is desired.

By means of this construction, we have provided a pivoted thrust pad where the bearing material is placed under a compressive stress in both a radial and a circumferential direction, thus enabling it to withstand sudden shock loads without failing. By controlling the difference in dimensions between the bearing portion 4 and the dove-tailed channel in retaining member 6, any desired radial compressive strain can be placed on the bearing material 4. Likewise, the amount of circumferential compressive strain in bearing material 4 can easily be controlled by the design of spring action retaining plates 10 and by control of the relative length of bearing portion 4 and channel 6.

The pivoted thrust pads 2 each have a central recess 3 (Fig. 3) in the bottom of retaining member 6 by which each thrust pad 2 is mounted on the spherical end 16 of crown pins 14. The diameter of recess 3 is larger than the diameter of pins 14 to allow each thrust pad 2 to tilt in any direction on the spherical end 16 of pin 14. Pin 14 is shrunk or otherwise secured in a central opening in a main link 18 directly beneath each thrust pad. Each main link 18 is supported at each end by a bottom recess 19, each of which is mounted on the spherical end 21 of a crown pin 20. Pins 20 are shrunk or otherwise secured in openings provided in the adjacent ends of secondary links 22. Secondary links 22, in turn, are each supported by a central recess opening 23 which is mounted on the spherical end 26 of a crown pin 24, which is shrunk or otherwise mounted in frame member 28. It may be desirable under special conditions to coat or special treat the spherical ends of the supporting pins and their co-operating recesses to increase their wear resistance.

The pivoted thrust pads 2, main links 18 and secondary links 22 are all retained in a channel 25 formed in frame member 28 by a tongue and groove arrangement on the inner surface of thrust pads 2 and frame member 28, and a resilient snap ring 40 adapted to be removably mounted on the outer surface of frame member 28. The tongue and groove arrangement comprises a tongue 32 projecting radially outward from the inner surface of each retaining member 6 (Figs. 2 and 4) which loosely fits into a cooperating groove 30 on the inner flange of frame member 28. The resilient snap ring 40 fits tightly in grooves 36 on the outer surfaces of raised posts 38 of frame member 28, and loosely in grooves 34 in the outer surface of bearing member 6. The resiliency of snap ring 40 and the loose fit of tongues 32 in groove 30, and of ring 40 in grooves 34 permits limited movement of thrust shoes 2 in all directions. The raised posts 38 are spaced circumferentially and located between the adjacent ends of thrust pads 2. The ends of snap ring 40 are held firmly in place at one of the raised posts 38 by means of projections 44 on a retaining clip 42 (Figs. 5 and 6) which fit in corresponding notches in the adjacent ends of snap ring 40. Clip 42 is held in place by means of a small screw 46 threaded into post 38, or other suitable means.

In previous designs, it was necessary when assembling a thrust bearings of the pivoted pad type to first install the secondary links in the channel-shaped retaining member, then install the main links in their proper position and finally to install the pivoted thrust pads, and then while retaining all of the above-mentioned elements in their proper position, install the thrust collar which, in turn, held all of the elements of the thrust bearing in place. This method of assembly is both difficult and time-consuming and almost impossible to perform when a thrust bearing is installed in an inverted position, in which case all of the elements of the thrust bearing would tend to fall out of position due to gravity before the thrust collar could be placed in position. We have, by means of the construction described above, provided a unitary type of construction for a pivoted pad thrust bearing, wherein all of the elements comprising the thrust bearing are retained in position in one independent unit while the bearing unit is installed or removed from a supporting structure, yet all the elements are allowed freedom of movement so that they can assume their proper running position and the pivoted pads can establish a wedge-shaped film of lubricant. In order to remove the elements from our thrust bearing, it is only necessary to remove the clip 42 and then remove the resilient snap ring 40. After this, all of the thrust pads 2 and main links 18 and secondary links 22 can be removed in the conventional manner for servicing or replacement.

Fig. 7 shows a journal bearing constructed according to the teachings of our invention. A solid tubular bearing sleeve 50, preferably of a hard brittle material such as carbon graphite, aluminum oxide, stellite or tungsten carbide, is retained in an outer tubular cartridge 52. Outer cartridge 52 has an integral inwardly projecting radial flange 54 at one end, and a threaded cap 56 at the other end for retaining the bearing sleeve 50 in place. Threaded cap 56 has an inwardly projecting radial flange 58 which is adapted to engage the adjacent end of bearing sleeve 50.

In manufacturing this type of radial bearing, the outside diameter of bearing sleeve 50 is made slightly larger than the inside diameter of the outer cartridge 52, and the over-all length of bearing 50 is maintained slightly larger than the distance between the flange 58 on bearing cap 56 and the flange 54 on outer cartridge 52 when the bearing cap 56 is in contact with the end of the outer cartridge 52. In order to assemble the journal bearing shown in Fig. 7, the outer cartridge 52 and end cap 56 are heated until they expand sufficiently to allow bearing 50 to be slipped into the outer cartridge 52, and then the cap 56 is screwed into place until it is in contact with the adjacent end of cartridge 52 and the assembled journal bearing allowed to cool. Upon cooling, outer cartridge 52 will strink in both a radial and a longitudinal direction thereby compressing the bearing 50 in both a longitudinal and a radial direction. The bearing 50 then will be under a compressive stress in both a longitudinal and a radial direction, and will be capable of withstanding sudden shock loads which impose a tension type of stress. The amount of compressive stress applied to bearing 50 can be accurately controlled by controlling the dimensions of the bearing 50 and the dimensions of the outer cartridge 52 and end cap 56.

From the above description, it can be seen that we have provided preloaded bearings which are placed under an initial compressive stress in two different directions, thus enabling them to withstand sudden shock loads to a high degree. A shock load on a bearing imposes a bending-like stress which consists of a tension stress on one surface and a compression stress on the opposite surface of the bearing. If the initial compressive stress in the bearing is greater than any tension stress caused by the shock load, the bearing will always remain in compression, or if the initial compressive stress in the bearing is smaller, the shock load will only impose a small tension stress, which the material can easily withstand. Thus we are able to use hard and brittle materials as bearing materials even though they are weak in tensile strength, because in our bearing the bearing material, due to its preloading, is always under a compressive stress or a relatively small tension stress which the bearing material can withstand. We have also provided a unique method for retaining all of the various elements of the fully equalized pivoted pad thrust bearing in their proper position as a unit, while the bearing is assembled, yet providing for speedy removal of the various bearing elements when it is desired to service the bearing. While our retaining means contains all of the various elements of the thrust bearing in their proper position, it does not limit their freedom of motion but allows them to still tilt in any direction within limits so as to establish their proper running position and also move in the direction perpendicular to the plane of the thrust bearing.

While we have shown our invention in several forms, it will be obvious to those skilled in the art that it is not limited to these particular embodiments, and is susceptible to various other changes and modifications without departing from the spirit and scope of the invention.

We claim as our invention:

1. A method for making a preloaded radial bearing comprising the steps of forming a hollow bearing cylinder; forming a hollow casing cylinder having an inner diameter and the length thereof normally smaller, respectively, than the outer diameter and the length of said bearing cylinder; providing a stop at one end of said casing cylinder; threading the other end of said casing cylinder; forming a threaded cap for said casing cylinder; heating said casing cylinder and said cap; inserting said bearing cylinder within said casing cylinder and against said stop; threading said cap onto said casing cylinder until an end surface of said cap abuts said other casing cylinder end, and cooling said cap and said casing cylinder to apply a predeterminable amount of compressional stress to said bearing cylinder.

2. A method for assembling a preloaded radial bearing including a hollow bearing cylinder, a hollow casing cylinder having a stop at one end and a threaded portion at the other end thereof, said casing cylinder having the inner diameter and length thereof normally smaller, respectively, than the outer diameter and length of said bearing cylinder, and a threaded cap adapted to threadedly engage said casing cylinder; said method comprising the steps of heating said casing cylinder and said cap to a predetermined temperature, inserting said bearing cylinder within said casing cylinder, threading said cap onto said casing cylinder until an end surface of said cap abuts said other casing cylinder end, and cooling said cap and said cylinder until a predetermined amount of compressional stress is imparted to said bearing cylinder.

3. A preloaded bearing comprising a retaining member having an arcuate channel formed in a surface thereof; an arcuate bearing member mounted in said channel; a pair of elongated spring plates; and securing means disposed along the length of said plates and detachably and adjustably securing said plates to said retaining member at respective ends of said channel, said plates each having an elongated portion thereof in bearing contact with respective ends of said bearing member.

4. A preloaded bearing comprising an arcuate retaining member having an arcuate, dovetailing channel formed concentrically in a surface of said retaining member; an arcuate bearing member mounted in said channel and conforming thereto; a pair of elongated spring plates; securing means disposed along the length of said plates and detachably and adjustably securing said plates to said retaining member at respective ends thereof and of said channel; and a rib formed on each of said spring plates and extending longitudinally thereof, said ribs being in bearing contact with respective ends of said bearing member and being spacedly removed from said securing means.

5. In a thrust bearing, the combination comprising a plurality of arcuate thrust shoes; a supporting member having an annular channel formed in a surface thereof; means pivotally mounting said shoes at spaced positions in said channel; a number of posts secured to said supporting member, said posts being disposed adjacent said channel and individually between said shoes; said shoes each having a groove formed in the periphery thereof, all of said grooves lying in substantially the same plane; said posts each having a groove formed on the periphery thereof, said second-mentioned grooves lying substantially in said plane and forming a continuous array with said first-mentioned grooves; a resilient snap ring retained in said first- and second-mentioned grooves and cooperating therewith to couple at least partially said shoes to said supporting member; and means secured to one of said posts and coupling the ends of said snap ring.

6. In a thrust bearing, the combination comprising a plurality of arcuate thrust shoes, said shoes each having a groove formed in the periphery thereof; a supporting member having an annular channel formed in a face thereof; and means pivotally mounting said shoes at spaced positions in said channel, said means including a plurality of upstanding first crown pins individually secured to said supporting member at said positions, a secondary link member pivotally mounted on each of said first pins, a number of primary link members, means tiltably mounting said primary link members on ends of adjacent pairs of said secondary link members, and a like number of upstanding second crown pins individually secured to said primary link members, said second crown pins being individually inserted into loosely fitting recesses formed in the undersurface of said thrust shoes.

7. In a thrust bearing, the combination comprising a plurality of arcuate thrust shoes, said shoes each having a groove formed in the periphery thereof; a supporting member having an annular channel formed in a face thereof; means pivotally mounting said shoes at spaced positions in said channel, said means including a plurality of upstanding first crown pins individually secured to said supporting member at said positions, a secondary link member pivotally mounted on each of said first pins, a number of primary link members, means tiltably mounting said primary link members on ends of adjacent pairs of said secondary link members, and a like number of upstanding second crown pins individually secured to said primary link members, said second crown pins being individually inserted into recesses formed in the undersurfaces of said thrust shoes; a number of posts secured to said supporting member, said posts being disposed adjacent said channel and individually between said shoes; said posts each having a groove formed in the periphery thereof, all of said first- and second-mentioned grooves lying in substantially the same plane and forming a continuous array of said grooves; a resilient snap ring retained in said grooves and cooperating therewith to couple said shoes to said supporting member; and means detachably secured to one of said posts for coupling the ends of said snap ring.

8. A thrust bearing comprising a plurality of thrust shoes, each of said shoes being shaped like a portion of a sector of a circle and being circumferentially spaced from one another in an annular arrangement, a channeled annular member, means for pivotally mounting each of said thrust shoes in said channeled member, and means for retaining said thrust shoes in said annular member, said last mentioned means including a flange secured to said annular member adjacent the inner periphery of said channel and fitting loosely in grooves formed respectively on the inner periphery of said shoes, a plurality of posts secured to said annular member and disposed adjacent the outer periphery of said channel, and a snap ring loosely fitted in a groove formed in the outer surface of each of said thrust shoes and removably secured in outwardly opening radial grooves formed in said posts.

9. A thrust bearing comprising a plurality of thrust shoes, each of said shoes being shaped like a portion of a sector of a circle and being circumferentially spaced from one another in an annular arrangement, a channeled annular member, means for pivotally mounting each of said thrust shoes in said channeled member, and means for retaining said shoes within said member, said last-mentioned means including a flange secured to said annular member adjacent the inner periphery of said channel and fitted loosely in grooves formed respectively on the inner periphery of said shoes, a snap ring loosely fitted in a groove on the outer surface of each of said thrust shoes, a plurality of posts secured to said annular member and disposed adjacent the outer periphery of said channel at positions individually between said shoes, said snap ring being removably secured in outwardly opening radial grooves formed in said posts, and means detachably secured to one of said posts and coupling the ends of said snap ring.

10. In a thrust bearing, the combination comprising a plurality of arcuate thrust shoes, a supporting member having an annular channel formed in a face thereof, and means pivotally mounting said shoes at spaced positions in said channel, said means including a plurality of upstanding first crown pins individually secured to said supporting member at said positions, an elongated secondary link member pivotally mounted on each of said first pins, a pair of second crown pins mounted individually adjacent the ends of each of said secondary link members, a number of elongated primary link members, said second crown pins being individually inserted into loosely fitting recesses formed on the under surface of each of said primary link members to pivotally mount said primary link members on opposing ends of adjacent pairs of said secondary link members, and a plurality of upstanding third crown pins individually secured to said primary link members, said third crown pins being individually inserted into loosely fitting recesses formed in the under surface of said thrust shoes.

11. A preloaded bearing comprising a retaining member having a channel formed in a surface thereof, a bearing member mounted in said channel, a pair of elongated spring plates, and securing means disposed along the length of said plates and detachably and adjustably securing said plates to said retaining member at respective ends of said channel, said plates each having an elongated portion thereof in bearing contact with the respective ends of said bearing member.

References Cited in the file of this patent

UNITED STATES PATENTS

| | | |
|---|---|---|
| 499,012 | Cooper | June 6, 1893 |
| 1,117,500 | Kingsbury | Nov. 17, 1914 |
| 1,378,546 | Kingsbury | May 17, 1921 |
| 1,400,168 | Kingsbury | Dec. 13, 1921 |
| 1,666,521 | Allen | Apr. 17, 1928 |